United States Patent [19]

Gangwere, Jr. et al.

[11] Patent Number: 4,968,254

[45] Date of Patent: Nov. 6, 1990

[54] SYSTEM FOR SYNCHRONIZING THE OUTPUT SIGNALS FROM MULTIPLE MEDIA

[75] Inventors: Sherbie G. Gangwere, Jr., Monte Sereno; Jay R. Hosler, Soquel, both of Calif.

[73] Assignee: User Training Corporation, Los Gatos, Calif.

[21] Appl. No.: 345,370

[22] Filed: May 1, 1989

[51] Int. Cl.[5] .......................... G09B 19/00; G09B 5/00
[52] U.S. Cl. ..................................... 434/118; 434/309; 434/316; 360/72.2
[58] Field of Search ............... 434/118, 308, 309, 316, 434/319; 360/69, 71, 72.1, 72.2; 369/32, 49

[56] References Cited

U.S. PATENT DOCUMENTS 3,911,494 10/1975 Wilson et al. ......................... 360/92
4,586,905 5/1986 Groff ............................. 434/308 X
4,608,705 8/1986 Tanaka ........................... 360/72.2 X Primary Examiner—Richard J. Apley
Assistant Examiner—Jennifer L. Doyle
Attorney, Agent, or Firm—Gerald L. Moore

[57] ABSTRACT

The method of presenting events such as audio and video instructions to a computer user including the recording instructions in the form of an audio soudtrack 15 on a recording tape 10, assigning coded indicia 16 to the various instructional events of a computer program recorded in a memory 31 and recording the coded indicia and instructional events in a table lookup 29, recording a mulitplicity of each indicia on the recording tape adjacent the soundtrack portion the computer program event is to occur, and reading back the recording tape while feeding the audio signal to an audio output 36 and the indicia signal to the table lookup to cause the events or instructions to occur in synchronism.

10 Claims, 1 Drawing Sheet

SYSTEM FOR SYNCHRONIZING THE OUTPUT SIGNALS FROM MULTIPLE MEDIA

FIELD OF THE INVENTION

This invention allows, through the use of a computer, the collection and coordinated presentation of the outputs from various media through computer readout devices in real time.

BACKGROUND OF THE INVENTION

Systems utilizing a computer, and used primarily for training in computer usage, require the student to interact with a plurality of data inputs. For instance in U.S. Pat. Nos. 4,637 797 issued on Jan. 20, 1987, and 4,701 130 issued on Oct. 20, 1987, the student interacts with the computer keyboard while receiving oral instructions from a tape player. Recorded on the tape is keystroke data for input to the computer program.

One advantage such a system presents is the instructional data can be recorded on inexpensive media or recording tape and be read out by a similarly inexpensive tape reader. However, such tape systems are prone to a high error rate. Because keystroke data in digital form is used, the signals cannot be repetitive and any errors in detection can cause significant problems. Also any attempt to randomly access the recorded signals is made substantially impossible if present data detected is a progression of previous data since the keystroke information includes no indication of the order or progression of events.

It is therefore the principal object of the present invention to provide a manner of presenting simultaneous events from a multiple series in a preselected order with great accuracy and in a manner allowing random access to one series and the automatic synchronization of all other series.

SUMMARY OF THE INVENTION

The method of presenting events such as audio and video instructions to a computer user including the recording of audio instructions on a recording tape the assigning of coded indicia to the various events of a computer program, recording the computer program in the computer memory along with a table lookup for detecting each event by use of the coded indicia, recording the coded indicia on the recording tape at the position to be presented relative to the audio instructions and reading back the audio tape by feeding the detected coded indicia to the computer while playing the audio signal thereby to present to the user instructions both through the computer and verbally as recorded on the audio tape.

DESCRIPTION OF A PREFERRED EMBODIMENT OF THE INVENTION

Figure 1:
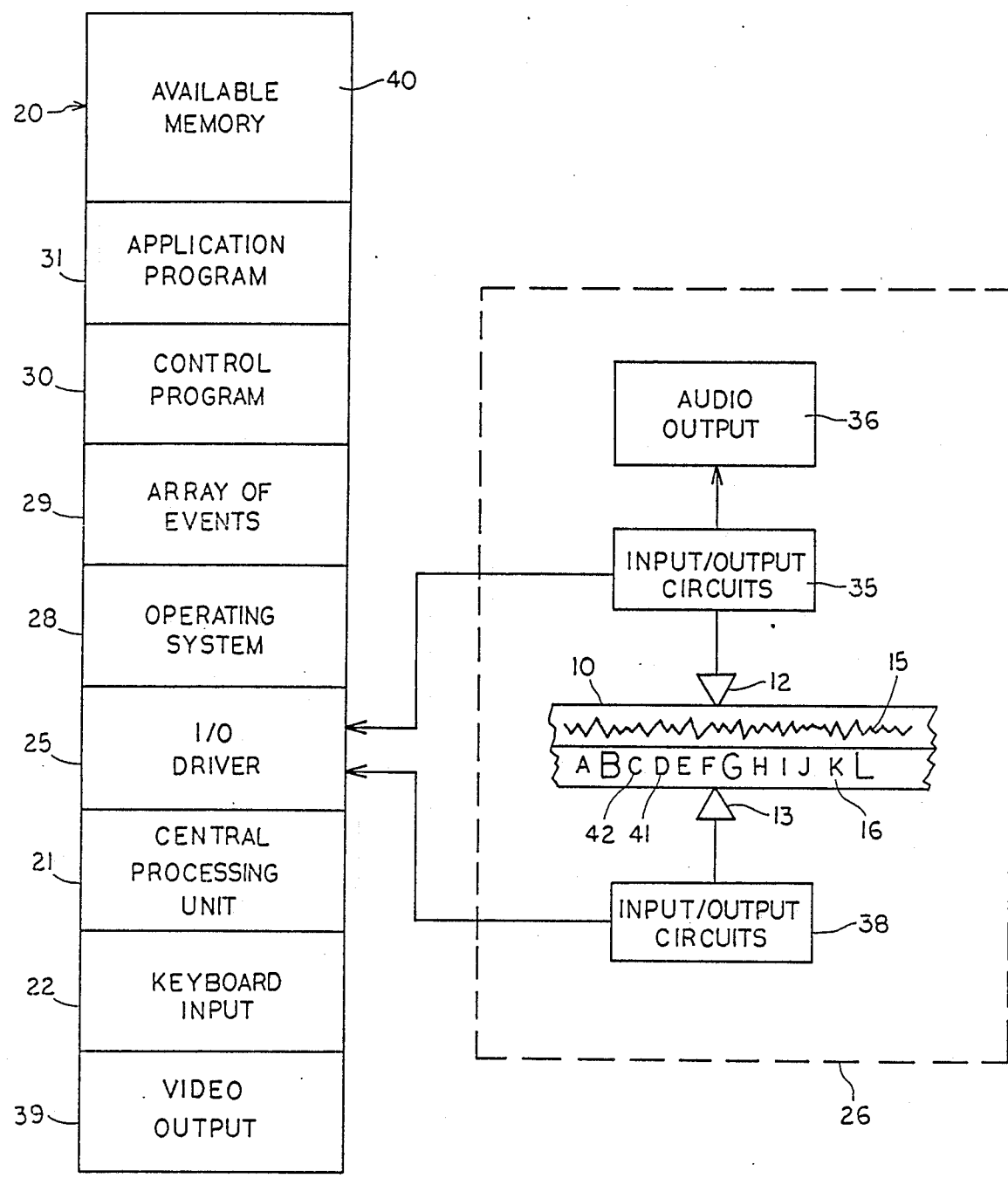
FIG. 1 is a block diagram and schematic of a computer system and tape cassette suitable for practicing one embodiment of the invention.

A preferred embodiment of the invention utilizes stereo cassette having a magnetic medium or tape 10 on which multiple parallel tracks of data can be recorded. As shown in FIG. 1, the magnetic tape 10 from an audio cassette 26 is recorded on and read by read/write heads 12 and 13 positioned to write and detect parallel tracks 15 and 16, respectively, on the medium. In this instance the track 15 represents an audio track and the track 16 represents a digital track of indicia indicated by the letters.

The overall purpose of this embodiment of the invention is to provide instructions to a user in the form of verbal information and explanations while displaying on a computer video screen various progressive phases or steps of a selected computer program for study. For this purpose a standard computer system 20 is provided comprising a central processing unit 21 which can be supplied input commands through a keyboard input 22. An input/output driver 25 connects with external devices such as the tape drive 26. The computer system 20 also includes such usual components as the operating system 28. In addition, the invention requires an array of events 29 or table lookup and a control program 30. The application program 31 represents the program that is being demonstrated for teaching or demonstration purposes. Obviously, this can be any program which will function on the computer system shown.

In practice, the tape 10 is started by signaling the control program 30, and is driven past the audio pickup head 12 which sends the audio signal detected through the I/O circuit 35 to the audio output 36 which preferably is a speaker or earphones positioned to provide an audio signal to the operator of the computer keyboard. At the same time the head 13 detects the recorded digital signal 16 and sends it through the I/O circuit 38 to the computer system 20. This digital information is processed by the control program 30. As this control program processes the data it sends resulting commands (which are read from the array of events (29) to the application program which causes program stages or events to be displayed on the video display 39. It should be understood that an event can be for instance, data to display on a screen a command to load a program, a command to a program, a command to save text from a display buffer, a command to write data on portion of the display or a no-operation event but is not limited to these examples. Thus the user has two instructional inputs, one audio input from the speaker 36 and the other a visual input from the video 39. The audio tells the user what is happening, and possibly some inputs to insert through the keyboard 22, while the video shows the resulting interaction of the computer and application program. In the meantime, the interspersed keyboard inputs inserted by the user are recorded in the available memory 20.

In accordance with one feature of the invention, indicia other than keystrokes are recorded to identify the event to accompany and be synchronized with the audio output. By recording indicia instead of keystrokes, multiple or groups of indicia provide a high level of redundancy, thereby enabling the control program to select the correct event from the array of events, even if there is a high error rate in the indicia read. The indicia signal is fed to the table lookup or array of events 29 to determine the keystroke to be fed to the control program. Additionally, the indicia are assigned to indicate the order recorded thereby indicating when the tape has been repositioned. Obviously, when the indicia detected is not in the order recorded, the tape has been repositioned since the last indicia detected.

In accordance with another feature of the invention, the system provides for random replay, that is the user is given the opportunity to rewind the tape and replay any portion desired with instantaneous synchronization of the audio and video inputs. For this purpose, commands are fed through the keyboard to stop and rewind the tape 10 (or alternately, the cassette drive can be rewound by the user. Naturally, the new starting position will more or less be randomly chosen. As soon as tape position signals carried by the digital signal 16 are processed, the computer system will recognize the indicia detected is not a natural progression from the last indicia detected. This is accomplished by comparing the coded indicia detected with the next preceding coded indicia detected or by the table lookup indicating the order of the indicia. In the subject embodiment, three coded indicia read consecutively must be identical before that signal is transmitted to the system to cause the event or keystroke the indicia identifies to occur. Since the coded indicia detected immediately after a random repositioning will not be either a natural progression from the last indicia detected nor the same as the last coded indicia detected, the indicia detected will be stored but not used to trigger the occurrence of any event until three identical indicia are detected. At this time the event will be triggered.

Thus, by use of multiple coded indicia to identify each event, two benefits are derived. Firstly, if any one, two or even a large number of indicia are erroneous, that is, they do not correctly identify an event that should be triggered at that time, the wrong event will not occur because a correct multiplicity of indicia must be detected in succession before the event is triggered. By comparing each indicia with a predetermined number of preceding indicia, erroneous readings are detected and ignored thereby allowing the use of inexpensive recording media to record the coded indicia indicating the event to take place. Secondly, by the comparing of each indicia read to the indicia previously detected and by using a table lookup or other means to indicate the order in which the indicia is recorded, the system is enabled to detect when a random repositioning of the recording medium has taken place. In this manner the sequence of events is adjusted automatically to synchronize with the positioning of the recording media which in this embodiment is the tape 10.

In accordance with another feature of the invention, not only can the sequence of events be restarted at any position on the medium but where several events must occur in succession, the restart can occur during any succession of events. For instance if the events are successive steps in a computer program where each step builds on the next preceding steps, the preceding steps must be executed before the occurrence of the immediate event. For this purpose the coded indicia not only indicate the event but also indicate any family of events that must always be read in succession.

As evidenced by the alphabet letters B and G of track 16 (FIG. 1), there are several points at which the program can be restarted with no input from previous events. However if restart is attempted at indicia c, d, e or f, each of these positions represent those phases of the program which are progressive that is they build onto the previous event or events. For instance the user may have been instructed to insert certain data through the keyboard or the program sequence may be a progression from the next preceding instruction. In these instances the array of events 29 is interrogated to determine if the randomly selected starting point is an independent event or a dependent event. If an independent position, meaning the instruction or event does not depend on previous occurrences, the video output starts immediately. If a dependent position is detected, the program phases must be retraced to the next preceeding independent event and the video output initiated. Naturally all intervening inputs by the user through the keyboard are inserted also, having been recorded in the available memory 40.

For this purpose, when a coded indicia is detected it is also tested to determine whether a repositioning of the media has occurred since the last indicia was detected and if this indicia is a natural progression from the last indicia. If either of the above occurrences is indicated, the indicia is also tested to determine if it represents a dependent or an independent event. If independent, the event order is retraced until the next preceding independent event is detected Thereafter, the event signalled by that indicia is triggered followed in succession by any intervening events until the event is reached at which the medium is repositioned. Of course, the intervening events would normally not be illustrated on the video readout but only the selected event is visible immediately representing the natural combination of all the preceding events and corresponding to the readout from the track 15 of the tape. In certain cases it may be necessary to display the intervening events on the video readout and this can be effected also.

We claim

1. The method of presenting events in a preselected order wherein the events are selected from a first and second series of events, said method comprising the steps of:
   recording the first series of events on a first media;
   assigning separate coded indicia to each event of said second series;
   recording said second series of events on a second media with a table lookup identifying each event with the respective coded indicia;
   recording multiple numbers of each coded indicia on the first media adjacent the first series event at which the second series event is to occur;
   reading back and presenting the first series of events in the order detected on the first media; and
   reading back the coded indicia and referring to the table lookup to present the associated second series event only when the coded indicia is detected in a preselected manner.

2. The method as defined in claim 1, wherein the preselected manner is the detection of a predetermined number of like coded indicia in consecutive order.

3. The method as defined in claim 1, wherein the coded indicia includes means to indicate the assigned order of presentation of the identified events.

4. The method as defined in claim 3, including means for detecting and indicating when the coded indicia are read out of the assigned order thereby indicating the first media is not being read continuously.

5. The method of synchronizing audio instructions with a display on a computer screen to teach a student how to interact with a program of events in a predetermined order in a computer system, comprising the steps of:
   recording a first track on a cassette tape comprising an audio signal which can be ready by a reader and fed to a speaker to generate audio signal including instructions to the student;
   recording a second track on the cassette tape comprising a plurality of groups of indicia with each group being individually detectable from each other group and each indicia of a group being capable of causing the computer system to execute a corresponding event of the program on the computer screen;

providing a first reader with a speaker for reading the audio signal from the cassette tape and feeding the audio signal from the cassette tape and providing audio instructions to the student;

providing a second reader for reading the second signal from the cassette tape and feeding the corresponding indicia to the computer system only when a plurality of indicia of a group is detected in a predetermined sequence to cause the event identified with the indicia read to be displayed on the computer screen; and providing input means for the student to interact with the computer system to manipulate the displayed program in response to the audio instructions.

6. The method as defined in claim 5 including the step of providing in the computer system of a memory for recording the inputs provided through the input means by the student.

7. The method as defined in claim 6 including the step of allowing of the students to access the cassette tape at any point to begin the instruction.

8. The method as defined in claim 5 including means to detect whether the indicia of a group read by the second reader causes the program to execute an event normally following the event indicated by the preceding group of indicia detected to determine if the cassette tape has been repositioned since the preceding indicia was read.

9. The method of synchronizing audio instructions with a second signal causing the display of a sequence of events on a display system to a student having means to interact with the display, comprising the steps of:

recording an audio signal and a second signal on a recording media;

reading back both signals simultaneously from said recording media;

feeding the audio signal to a speaker to provide audio instructions to the student;

feeding the second signal to the display system responding thereto to supply an event to be displayed corresponding tot he particular audio instructions being provided;

enabling of the display system to display multiple events wherein each event is a progression of the next preceding event;

providing means to enable the student to interact with the display system and change the events displayed;

providing means for recording changes to the events provided by the student;

providing means for allowing the student to access the recording media at any event; and providing means to display previous events where the student accesses randomly an event that is a progressive on previous events.

10. The method of synchronizing audio instructions with a display on a computer screen to teach a student how to interact with a program of events in a predetermined order in a computer system, comprising the steps of:

recording a first track on a cassette tape comprising an audio signal which can be read by a reader and fed to a speaker to generate an audio signal including instructions to the student;

recording a second track on the cassette tape comprising a series of indicia individually detectable from each other and each capable of causing the computer system to execute a corresponding event of the program on the computer screen;

providing a first reader with a speaker for reading the audio signal from the cassette tape and feeding the audio signal from the cassette tape and providing audio instructions to the student;

providing a second reader for reading the second signal from the cassette tape and feeding the corresponding indicia to the computer system to cause the event identified with the indicia to be displayed on the computer screen;

providing input means for the student to interact with the computer system to manipulate the displayed program in response to the audio instructions;

detecting whether the indicia read by the second reader causes the program to execute an event normally following the event indicated by the preceding indicia detected to determine if the cassette tape has been repositioned since the preceding indicia was read; and causing the computer system to execute other events of the program prior to the execution of the event indicated by the indicia detected when required for the proper execution of the program.

* * * * *